(12) United States Patent  (10) Patent No.: US 7,862,714 B2
Brejnbjerg et al.  (45) Date of Patent: Jan. 4, 2011

(54) RECLAMATION UNIT FOR A LIQUID (75) Inventors: Lars Brejnbjerg, Ebeltof (DK); Bjarne Egelind, Ebeltoft (DK)

(73) Assignee: Greenoil Standard APS, Ebeltoft (DK)

( * ) Notice: Subject to any disclaimer, the term of this patent is extended or adjusted under 35 U.S.C. 154(b) by 716 days.

(21) Appl. No.: 11/575,932

(22) PCT Filed: Sep. 24, 2004

(86) PCT No.: PCT/DK2004/000652

§ 371 (c)(1),
(2), (4) Date: Nov. 13, 2007

(87) PCT Pub. No.: WO2006/032270

PCT Pub. Date: Mar. 30, 2006

(65) Prior Publication Data

US 2008/0116121 A1  May 22, 2008

(51) Int. Cl.
*B01D 36/02* (2006.01)
(52) U.S. Cl. .......... 210/180; 184/6.24; 210/85; 210/90; 210/184; 210/258; 210/295; 210/303; 210/314; 210/317; 210/483; 210/489; 210/503; 210/505
(58) Field of Classification Search ........ 184/6.22, 184/6.24; 210/85, 87, 90, 96.1, 103, 112–115, 210/143, 149, 175, 180, 184, 258, 299, 303–305, 210/314–317, 335, 503–508, 532.1, 534, 210/295, 483, 489; 123/196 A
See application file for complete search history.

(56) References Cited

U.S. PATENT DOCUMENTS 3,616,885 A * 11/1971 Priest .......... 196/128
4,295,966 A * 10/1981 LeBlanc et al. .......... 210/180
4,349,438 A * 9/1982 Sims .......... 210/180
4,507,204 A * 3/1985 Tanaka et al. .......... 210/497.01

(Continued)

FOREIGN PATENT DOCUMENTS

EP  0 295 871 B1  3/1993

(Continued)

*Primary Examiner*—Joseph W Drodge
(74) *Attorney, Agent, or Firm*—Antonelli, Terry, Stout & Kraus, LLP.

(57) ABSTRACT

The present invention is a reclamation unit (1) for a liquid comprising a housing (4) with a detachable upper (2) and lower (3) part in which the lower part (3) is connected with a base part (13). The lower part (3) comprises at least one heating unit (17) and inlets (14) and outlets (15,34). The upper part (2) encloses at least one filter unit (8). The lower part (3) and the base part (13) form an evaporation chamber (27), wherein the connection between the lower part (3) and the base part (13) includes a separator plate (19) which guides the liquid from the filter unit (8) onto side walls (37) of the evaporator chamber (27). The heating unit (17) protrudes into the evaporator chamber (27) with no conductive contact to the side walls (37). The present invention also is a filter unit (8), preferable for use in a reclamation unit (1), wherein the filter unit (8) comprises a filter canister (9), wherein membranes (24,28), a first filter medium (25), and a second filter material (26) are arranged, to enclose an inlet tube (10), and where the first filter material (25) is formed of hydrophobic fibers, and the second filter (26) material is formed of fine-mesh fibers.

21 Claims, 7 Drawing Sheets

U.S. PATENT DOCUMENTS

| | | | | |
|---|---|---|---|---|
| 4,680,110 A | * | 7/1987 | Davis | 210/114 |
| 5,198,104 A | | 3/1993 | Menyhert | |
| 6,083,406 A | * | 7/2000 | DePaul et al. | 210/742 |

FOREIGN PATENT DOCUMENTS

| | | |
|---|---|---|
| GB | 373556 | 5/1932 |
| WO | WO 96/23854 | 8/1996 |
| WO | WO 97/26978 | 7/1997 |
| WO | WO 99/36153 | 7/1999 |

\* cited by examiner

RECLAMATION UNIT FOR A LIQUID

BACKGROUND OF THE INVENTION

1. Field of the Invention

The present invention relates to a reclamation unit for a liquid comprising a housing with a detachable upper and lower part where said lower part is connected with a base part which comprises at least one heating unit and a number of inlets and outlets where said upper part encloses at least one filter unit, and where the lower part and the base part form an evaporation chamber. The present invention furthermore relates to a filter unit, preferable for use in a reclamation unit.

2. Description of the Prior Art

In many types of equipment liquid is used as, for example a lubricant, a coolant, a propellant or the like, and the liquid is circulated in closed systems. Even so the liquid is exposed to, for example temperature changes, contaminants, and water that degrades the efficiency of the liquids as, for example a lubricant, a coolant or a propellant, and there is a risk of damaging the equipment by circulating the liquid too many times in the closed system.

One very expensive and impractical way to resolve this problem is to supply a continuous flow of new liquid to the equipment and discharge the liquid when it has passed through the equipment.

A more practical solution is to fit the equipment with a reclamation unit that provides removal of solid contaminants and water when liquid is passed through the reclamation unit. The reclamation unit can either process all the liquid or be a by-pass unit that continuously processes a fraction of the fluid so that the liquid is maintained at a high level of quality.

EP-A2-0 295 871 describes an oil reclamation device where oil is lead through a filter unit and an evaporation chamber for removal of water and solid contaminants, and where the evaporation chamber is positioned above the filter unit.

WO-A1-97/26978 describes an oil reclamation device where oil is lead through a composite filter unit and an evaporation chamber for removal of water and solid contaminants, and where the evaporation chamber is positioned above the composite filter unit.

WO-A1-96/23854 describes an oil reclamation device where oil is lead through a filter unit and an evaporation chamber for removal of water and solid contaminants, and where the evaporation chamber is positioned beneath the filter unit.

All three oil reclamation devices can remove water and solid contaminants when the oil is passed through the devices, but there are a number of disadvantages in the construction of these devices.

The devices all use a heating element encased in a base element of heat conductive material, which together with an approximately complementary part, forms the evaporation chamber. When the heating element is turned on, the heat will be distributed through the base element into, for example protruding fins or ring walls of the counterpart upon which a thin oil film will pass, hence the oil is heated and the water is evaporated.

A main disadvantage of this construction of the evaporation chamber where there is a direct contact between the heat surface and the oil, is that there is a high risk of superheating the oil whereby the characteristics of the oil will be changed and thus the oil becomes unusable with the connected equipment.

Another disadvantage of this construction of the evaporation chamber is that the walls of the entire evaporation chamber are heated, and the desired temperature in the evaporation chamber or on the contact surfaces will only be obtained with a high energy consumption because there is a relatively high energy loss to the enclosing environment and the material mass of the base element, and the protruding fins or ring walls must be heated.

Yet another disadvantage of this construction of the evaporation chamber is that when the oil is heated, it causes heat loss from the oil, and furthermore the heating of the oil will not contribute to further evaporation of water.

Both EP-A2-0 295 871 and WO-A1-97/26978 describe oil reclamation devices where the evaporation chamber is positioned above the composite filter unit which is a disadvantageous construction where any change of the composite filter unit could lead to spillage of oil.

In EP-A2-0 295 871 the filter material is compressed cotton and polypropylene fibers with an oxidation inhibitor.

In WO-A1-97/26978 the filter material is twisted continuous filament of unbleached natural cotton in the by-pass filter and filter where the filament is compressed differently in order to control the cleaning efficiency of the filters.

In WO-A1-96/23854 a filter material like, for example unbleached natural cotton fibers is used which can filter solid contaminants from the oil. The compression of the fibers varies throughout the filter material, thereby controlling the cleaning efficiency of the filter.

The disadvantage of using a filter material with intentional varying compression throughout the filter material is that the production of the filter unit becomes complicated because it is necessary to precisely control the compression of the filter material in order to obtain the necessary cleaning efficiency of the filter without the risk for clogging.

The disadvantage of producing a filter unit with a filter and a by-pass filter is that it is a more complicated construction, hence a higher cost for the filter unit.

SUMMARY OF THE INVENTION

The present invention provides a reclamation unit, which efficiently removes solid contaminants and water from a liquid, for example oil, with low energy consumption and the risk of damage due to superheating of the liquid is reduced.

This is obtained with a reclamation unit, wherein the connection between the lower part and the base part is provided with a separator plate arranged for leading the liquid from the filter unit onto side walls of the evaporator chamber, and the heating unit protrudes into the evaporator chamber with no conductive contact to the side walls.

The present invention further provides a filter unit, which has a high filter capacity, long service life and a small and/or compact design.

A filter unit comprises a filter canister, wherein a number of membranes, a first filter medium, and a second filter material are arranged enclosing an inlet tube, and where the first filter material is formed of hydrophobic fibers, and the second filter material is formed of fine-mesh fibers.

In the following the reclamation unit is described as an oil reclamation unit, but it should be noted that the reclamation unit and/or filter unit can be used with other liquids where it is necessary to remove solid contaminants and water.

The reclamation unit comprises a housing with a detachable upper and lower part in which the lower part is connected with a base part, which comprises at least one heating unit and a number of inlets and outlets and in which the upper part encloses a filter unit, and in which the lower part and the base part form an evaporation chamber. Thus the reclamation unit has the filter unit on top of the evaporation chamber which is advantageous because due to gravity, the oil will automatically flow downwards, and only small amounts of oil will be left in the filter unit when the reclamation unit is not used or discarded.

Since the heating unit protrudes into the evaporator chamber with no conductive contact to the side walls, and the separator plate forces the oil outwards onto the side wall of the evaporator chamber, the heating unit will never be in contact with the oil film on the side wall. Hence the heating of the oil will be caused by convective heat transfer to the atmosphere enclosed in the evaporation chamber, allowing only the surface of the oil film to be heated, and therefore the evaporation process in the reclamation unit uses a very small amount of heat because it is not necessary to heat the evaporation chamber walls in order to prohibit condensation of formed steam. Heating of the evaporation chamber walls causes a large amount of heat loss to the surroundings and furthermore heats the oil in this process.

The evaporation process in the reclamation unit utilizes a central heating unit which by convection heats the evaporation chamber atmosphere. The surface temperature and surface area of the heating unit can be adjusted so as to reduce the amount of radiated heat energy which will contribute to heat loss by heating the flowing oil in the evaporation chamber. Only the convective heat transfer from the hot atmosphere in the evaporation chamber to the surface of flowing oil film on the evaporation chamber wall causes evaporation of water from the oil.

Furthermore when the heating unit is not in contact with the side wall of the evaporation chamber, due to the conductive effect, the surroundings cause the side wall of the evaporation chamber to be at a temperature lower than the temperature of the evaporation chamber atmosphere. Thus there is not a high energy loss from the reclamation unit to the surroundings, and furthermore the risk of superheating the oil is reduced significantly.

The separator plate has four main functions:
- it supports the filter unit;
- it guides the oil to the edge of the evaporator chamber where it is distributed onto the side wall and forms an airtight oil film preventing steam from entering the filter unit;
- a drip nose in the edges prevents oil from flowing underneath the separator plate; and
- it insulates the heat in the evaporation chamber from the filter unit whereby steam and heat are prevented from condensing at the filter unit because the evaporator chamber is completely closed.

In one embodiment of the present invention the heating unit is a heating element, for example enclosed in a thermal element of heat conductive material whereby conductive heat transfer occurs from the heating element to the thermal element, and convective heat transfer occurs from the thermal element to the oil film on the side wall of the evaporation chamber.

Generally, the thermal element is typically formed with the same shape as the evaporation chamber whereby there is only a small gap between the side walls of the evaporation chamber and of the thermal element. This ensures that the convective heat transfer to the oil film can occur evenly throughout the entire evaporation chamber.

In a preferred embodiment of the invention the heating unit is a heating coil whereby conductive heat transfer occurs directly from the heating coil to the oil film on the side wall of the evaporation chamber. Due to fact that the size of the evaporation chamber is designed to provide sufficient surface area for the oil film, the heating coil will typically leave much open space in the evaporation chamber. This is not a disadvantage because the convective heat transfer is more efficient when there is space for circulating the air.

Furthermore, it is possible to provide heating coils with cold zones whereby it is possible to isolate the heating coil from the base part whereby heating of the base part is avoided and further heat loss to the surrounding.

In one embodiment of the present invention, the base part furthermore comprises at least one pressure indicator, at least one steam indicator, and a number of flow regulators.

The pressure in the filter unit is monitored by a pressure gauge. By employing a flow regulator, the filter unit is protected against uncontrolled excess flow caused by pressure variations at the inlet. Uncontrolled excess flow could damage the filter structure. Furthermore, by keeping the oil flow at a controlled steady level, filter contamination is directly proportional to the increased pressure of the filter unit, which can be read on the pressure gauge. Hence it is possible to determine when it is necessary to change the filter unit.

The steam indicator is provided for monitoring whether any water is removed from the oil. Therefore the base part has a steam outlet and the steam indicator comprises a viewing glass on which evaporated water will condense to form droplets or dew. The glass housing is insulated from the viewing glass so as to make the major part of the steam condense on the glass surface.

The background of the viewing glass is black in color so that it does not allow light to be reflected, thereby enhancing the visibility of condensed dew or droplets on the viewing glass. The steam indicator thus indicates the presence of water in the processed fluid.

Furthermore it is important that the steam indicator is positioned as closely as possible to the steam outlet from the base part in order to avoid steam condensing in the tube from the steam outlet to the steam indicator. Because of the relatively small amount of water evaporated from the oil, any steam condensed in the tube will make it difficult to determine whether the oil contains water or whether the water is removed properly.

To avoid oil contacting with the heating unit and the oil becoming superheated, the separator plate is provided with an encircling recess for forming a drip nose, which prevents any oil from running along the lower side of the separator plate and forming droplets above the heating unit. The encircling recess ensures that oil running on the lower side of the separator plate will form droplets at the circumferential area of the separator plate which causes the oil to fall past the heating unit and down upon the side walls of the evaporator chamber where the oil will spread and form a thin oil film.

To prevent steam from evaporation entering the same outlet as the purified oil, the base part furthermore comprises a plate member for forming a liquid trap. Hence a small amount of the oil is accumulated in the bottom of the evaporation chamber closing the oil outlet so that passage of steam is prohibited, while at the same time oil can pass in an unobstructed manner under the plate member and out.

The reclamation unit can be used as an insert unit in equipment and be dependent on the oil flow being generated by a pump or the like integrated in the oil system of the equipment. Thus it is only possible to use the reclamation unit when the oil system is active.

Instead of using an internal pump in the oil system of the equipment, the reclamation unit in one embodiment of the present invention furthermore comprises a pump unit. Therefore, it is possible to connect and use the reclamation unit in oil systems where there is no oil flow. Furthermore a reclamation unit with a pump unit can be used as a mobile unit by which it is possible to very easily move the reclamation unit from one set of equipment to another. It is then possible to switch the reclamation unit with a pump unit between the sets of equipment, hence the oil in both sets of equipment will have a high quality.

When used as a mobile unit, the reclamation unit can be mounted in a rack or a box for easy handling or for protecting the housing or more delicate parts of the reclamation unit, for example, pressure gauge or pump. Furthermore the rack or box can be used a mounting device for the reclamation unit.

To be able to provide a reclamation unit with easy access to the filter unit, the upper and the lower parts of the housing are connected and kept air tight with releasable fastening means, preferably a conical lever band and a sealing ring. It is then easy to release the releasable fastening means to remove the upper part of the housing to expose the filter unit for easy exchange or maintenance or inspection of all the parts in the lower part of the housing.

Alternatively to having a conical lever band and a sealing ring as releasable fastening means, it is possible to bolt the lower and upper parts of the housing together or use screws or clips engaging edges of both the lower and upper parts of the housing.

Typically, the reclamation unit will be applied as a by-pass unit maintaining oil quality in the connected equipment at a constant high level of quality. Furthermore the device may be utilized as a batch-refining unit that reclaims used oil to meet the specification of similar new oil.

To be able to use the reclamation unit in various applications, the filter unit comprises one or more filters that have different filtering abilities, for example to constrain particles, to inhibit undesired liquid contaminants, or to inhibit bacteriological pollution. It is possible to stack different filters in the filter unit or to stack filters having the same capabilities in the filter unit. For example such filters can be:

- a coarse filter for filtering large solid contaminants,
- a fine mesh filter for filtering small solid contaminants
- an absorbing or decomposing filter for inhibiting harmful pollutants or constituents,
- a UV filter for eliminating bacteriological pollution, and/or
- a filter for adding one or more specific components.

The reclamation unit can therefore be used with advantage for other applications than purifying oil for engine equipment, for example:

- purifying natural oils for food processing;
- purifying vegetable oils for lubrication and/or combustion;
- purifying coolants for compressors or refrigerators; and
- purifying propellants for compressors or hydraulic systems.

To obtain an efficient filter unit with a high filter capacity, long service life and a small and/or compact design, the filter unit in the present invention, the filter unit comprises a filter canister wherein membranes, a first filter medium, and a second filter material are arranged enclosing an inlet tube, and where the first filter material is formed of hydrophobic fibers, and the second filter material is formed of fine-mesh fibers.

The filter materials are arranged inside the filter canister enclosing an inlet tube whereby it is ensured that the oil is distributed to the entire filter material. The inlet tube furthermore ensures that the oil is passed from the bottom of the reclamation unit to the top of the filter unit whereby the oil diffuses through the filter material due to the oil pressure and gravity.

A first membrane is arranged in the top of the filter unit for preventing filtered solid contaminants and filter material from returning to the inlet tube and causing clogging of the inlet tube. The first membrane is typically a coarse filter membrane.

The oil is passed through the first filter material of hydrophobic fibers, which catches the large solid contaminants and ensures that the oil flow is evenly distributed throughout the filter unit. Because of the hydrophobic nature of the fibers, the oil and the water will not be attracted to the fibers, but diffuses in an unobstructed manner down through the layer of hydrophobic fibers. Then the oil is passed through the second filter material of fine-mesh fibers, which catch the very small solid contaminants. Furthermore the fine-mesh fibers will collect any loose fibers from the overlying layer of hydrophobic fibers.

In one embodiment of the present invention, the fine-mesh fibers furthermore are acid-neutralizing and therefore they can neutralize the acid components in the oil. Because of the acid-neutralizing nature of the fibers, acid contaminants will be removed from the oil, which if not removed, can cause severe damage in the oil system or the equipment due to acid corrosion.

A second membrane is arranged in the bottom of the filter unit for preventing loose fibers from the overlying layer of fine-mesh fibers from passing through the outlet holes of the filter unit into for example the evaporation chamber of the reclamation unit.

In a preferred embodiment of the present invention, the hydrophobic fibers are treated natural wool, which has the advantageous ability to contain large amounts of contaminants because it is provided with microscopic barbs. Furthermore, the hydrophobic nature of treated natural wool facilitates an even distribution of the oil flow through the cross section of the filter unit and limits the pressure required to maintain oil flow through the filter unit. Thus lower energy consumption is required to pass the oil through the filter unit.

Treated natural wool can, for example be from sheep, goats, lamas, rabbits or the like. The important thing it that the wool can be compressed and has a certain coarseness allowing oil to pass through, while at the same time large solid contaminants are retained.

In a preferred embodiment of the present invention, the fine-mesh fibers are treated natural cotton which has the ability to retain very small particles, and if the fibers furthermore are acid-neutralizing it can neutralize acid contaminants in the oil.

Alternatively to using treated natural cotton fibers, for example cellulose fibers from trees, hemp fibers, or the like can be used. The important thing is it that the fine-mesh fibers can be compressed into a material having a certain fineness which makes it capable of retaining very small solid contaminants while at the same time allowing oil to pass through. These alternatives would not all be acid-neutralizing fibers, but when the filter is used for liquids without acid contaminants, or where it is not important to remove acid contaminants, if any, such fibers can be used.

The hydrophobic fibers and fine-mesh fibers can be artificial fibers that are provided with the same material property as the currently usable hydrophobic fibers and fine-mesh fibers, for example, treated natural cotton and treated natural wool.

The ratio of the hydrophobic fibers and the fine-mesh fibers used in the filter unit is approximately 70:30, hence it is possible to obtain the necessary removal of larger solids contaminants in the hydrophobic fibers and small solid contaminants in the fine-mesh fibers.

Further combination shows that the filter unit will operate efficiently when the filter material has 60-90% hydrophobic fibers and 10-40% of fine-mesh fibers.

The combinations of treated natural wool and treated natural cotton fibers enable the filter unit to have a significantly higher filter capacity caused by the treated natural wool, without loosing the ability to filter very small particles which is performed by the treated natural cotton fibers.

Known filters with 100% cotton fibers/filament have poor filter capacities especially when filtering oil with large particles, soot or sludge because the input surface closes rapidly, causing the rest of the filter material to collapse. Hence 100% cotton filters must have a considerable size to have a sufficient capacity and service life.

In the aforementioned description, the filter is described in use with a reclamation unit for purifying oil, but it can be used with advantage for other applications than purifying oil, for example:
  as a filter for water cleaning
  as a filter for natural oils.

BRIEF DESCRIPTION OF THE DRAWINGS

The invention is explained in more detail below with reference to the accompanying drawing, where.

The reference numbers on the figures refer to the following:
1. Reclamation unit
2. Upper part of the housing 4
3. Lower part of the housing 4
4. Housing
5. Conical lever band
6. Lower edge of upper part 2
7. Upper edge of lower part 3
8. Filter unit
9. Filter canister
10. Inlet tube in the bottom lid 11
11. Outlet holes in the bottom lid 11
12. Bottom lid of the filter canister 9
13. Base part
14. Oil inlet in the base part 13
15. Oil outlet in the base part 13
16. Pressure gauge
17. Heating coil
18. Sampling outlet
19. Separator plate
20. Encircling recess in separator plate 19
21. Drip nose
22. Flow regulator
23. Ascension tube
24. Coarse filter membrane
25. First filter material
26. Second filter material
27. Evaporator chamber
28. Second filter membrane
29. Plate member
30. Air breather valve
31. Nipple
32. Ball
33. Spring windings
34. Steam outlet
35. Hole in plate member 29
36. Recess in plate member 29
37. Side walls of the evaporator chamber 27
38. Steam indicator
39. Viewing glass
40. Compartment of steam indicator 38
41. Black surface in compartment 40.

DETAILED DESCRIPTION OF THE INVENTION

Figure 1:
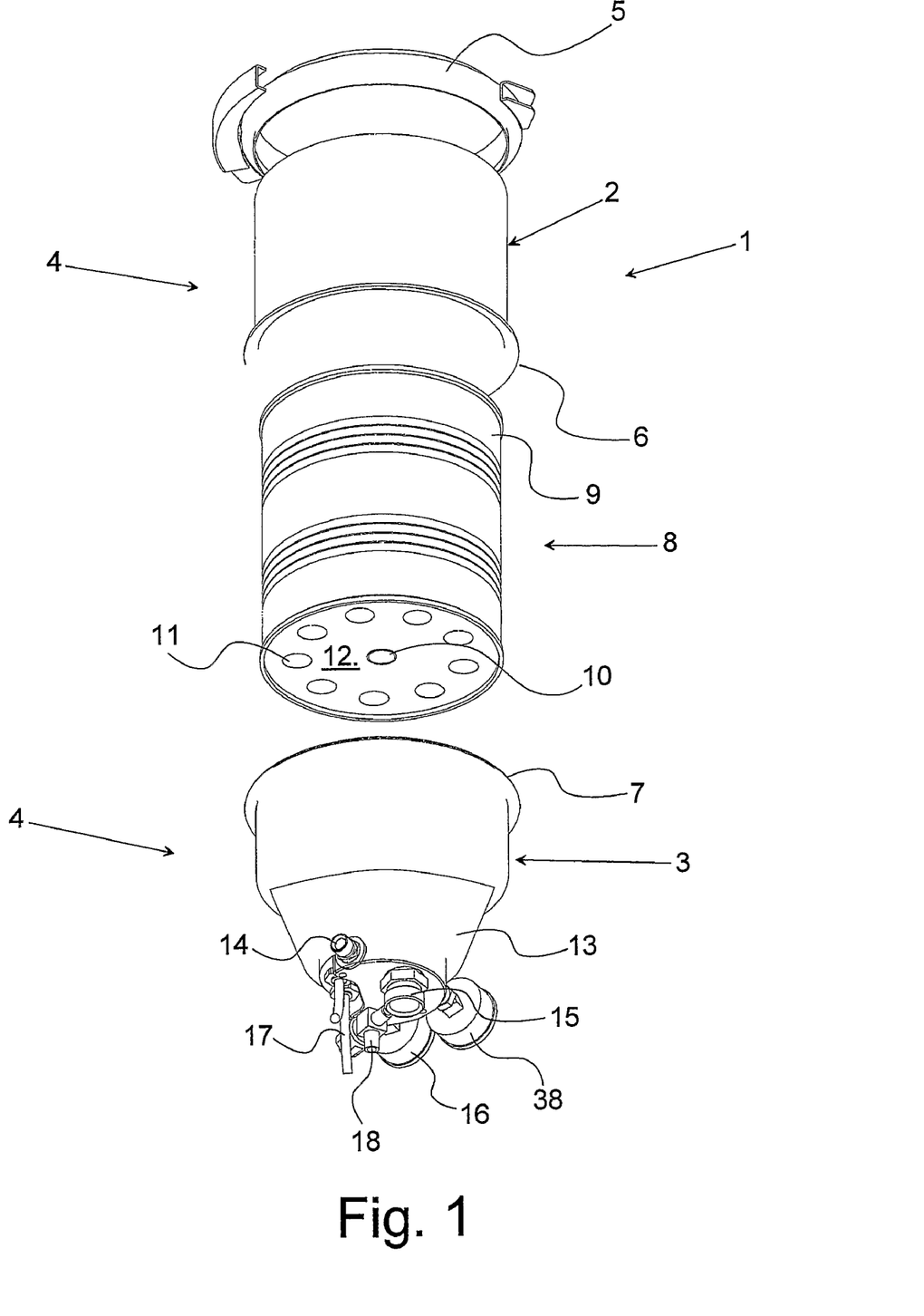
FIG. 1 shows an exploded view of a reclamation unit according to the invention.
Figure 2:
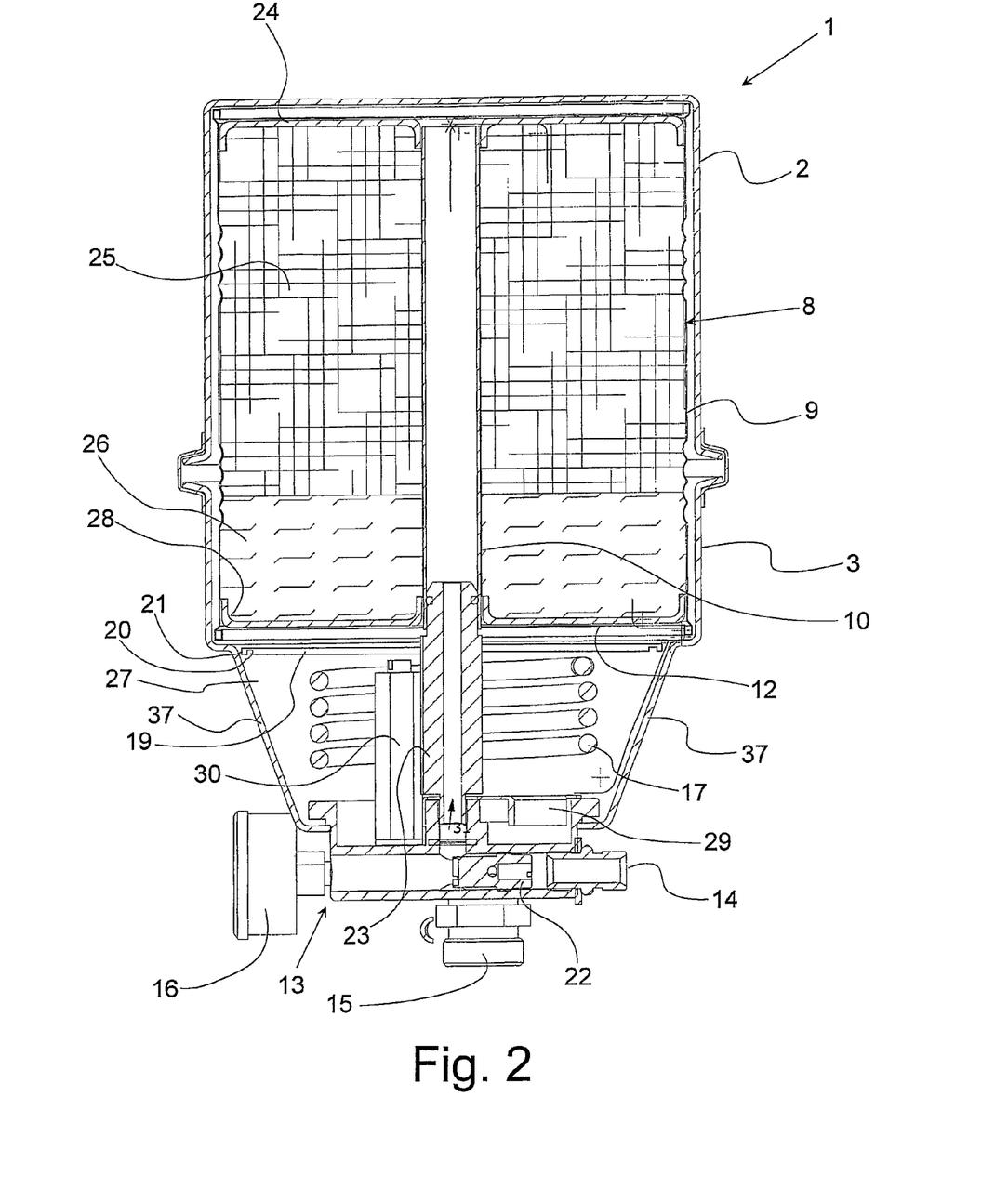
FIGS. 2-5 show cross sections of the reclamation unit in FIG. 1.
Figure 3:
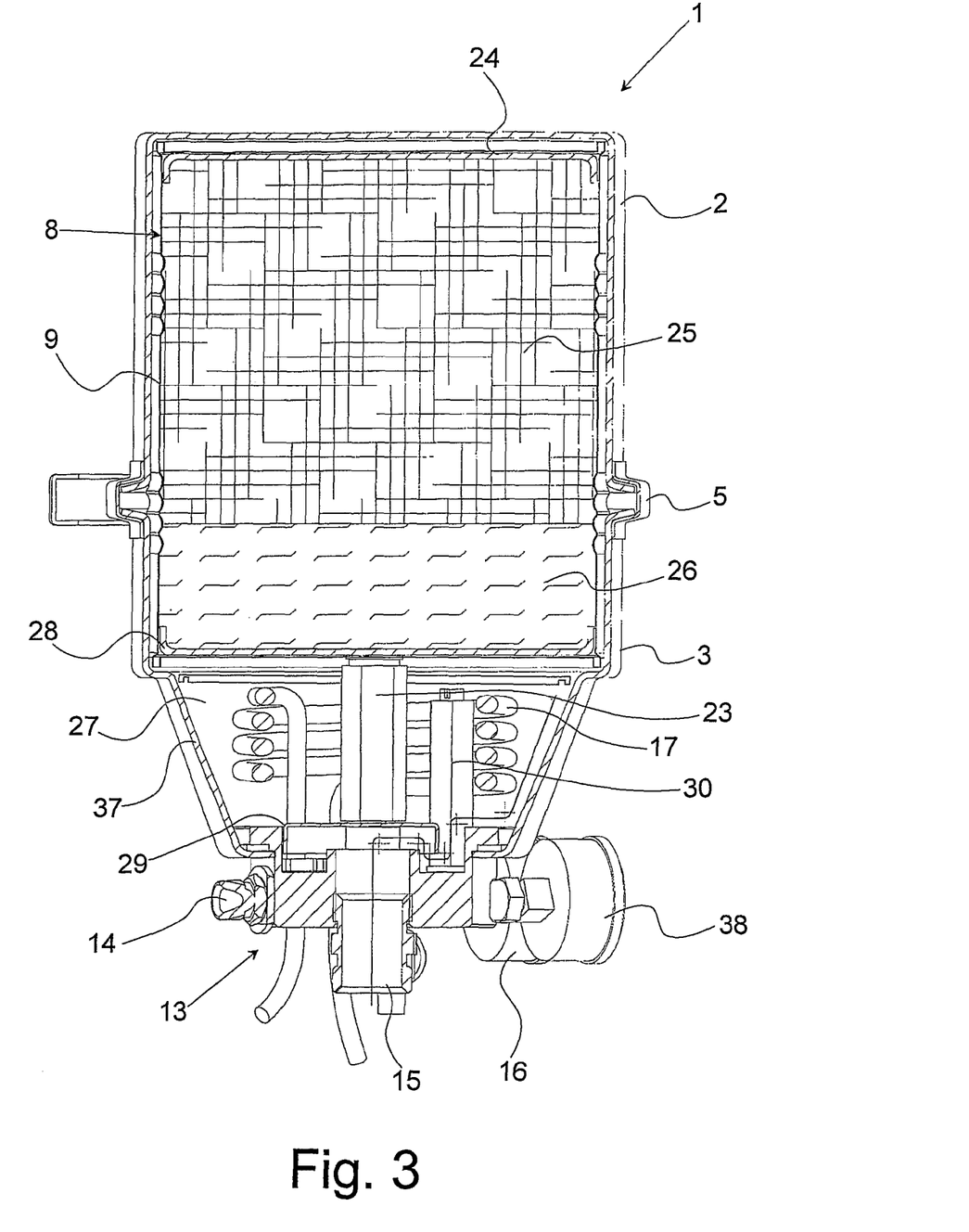
Figure 4:
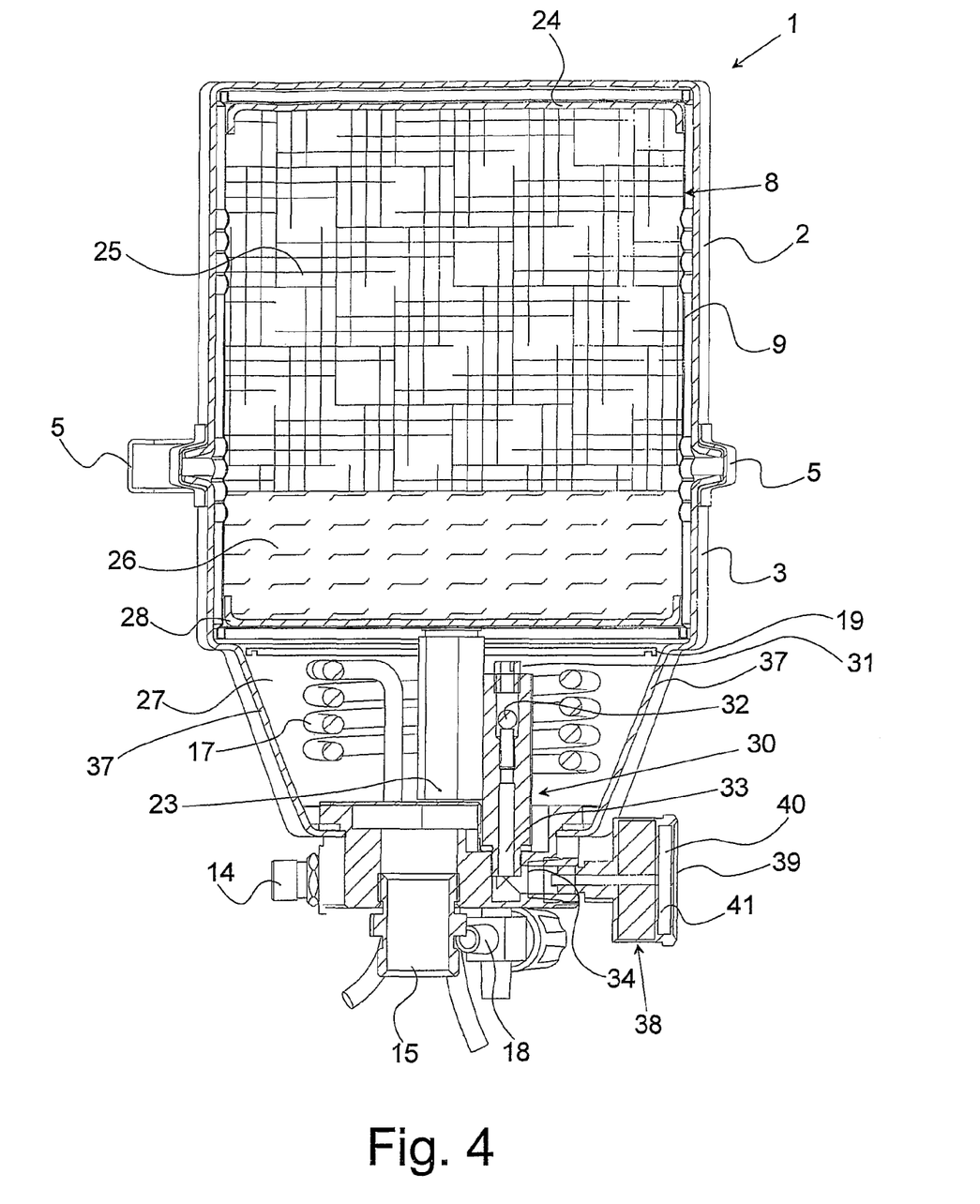
Figure 5:
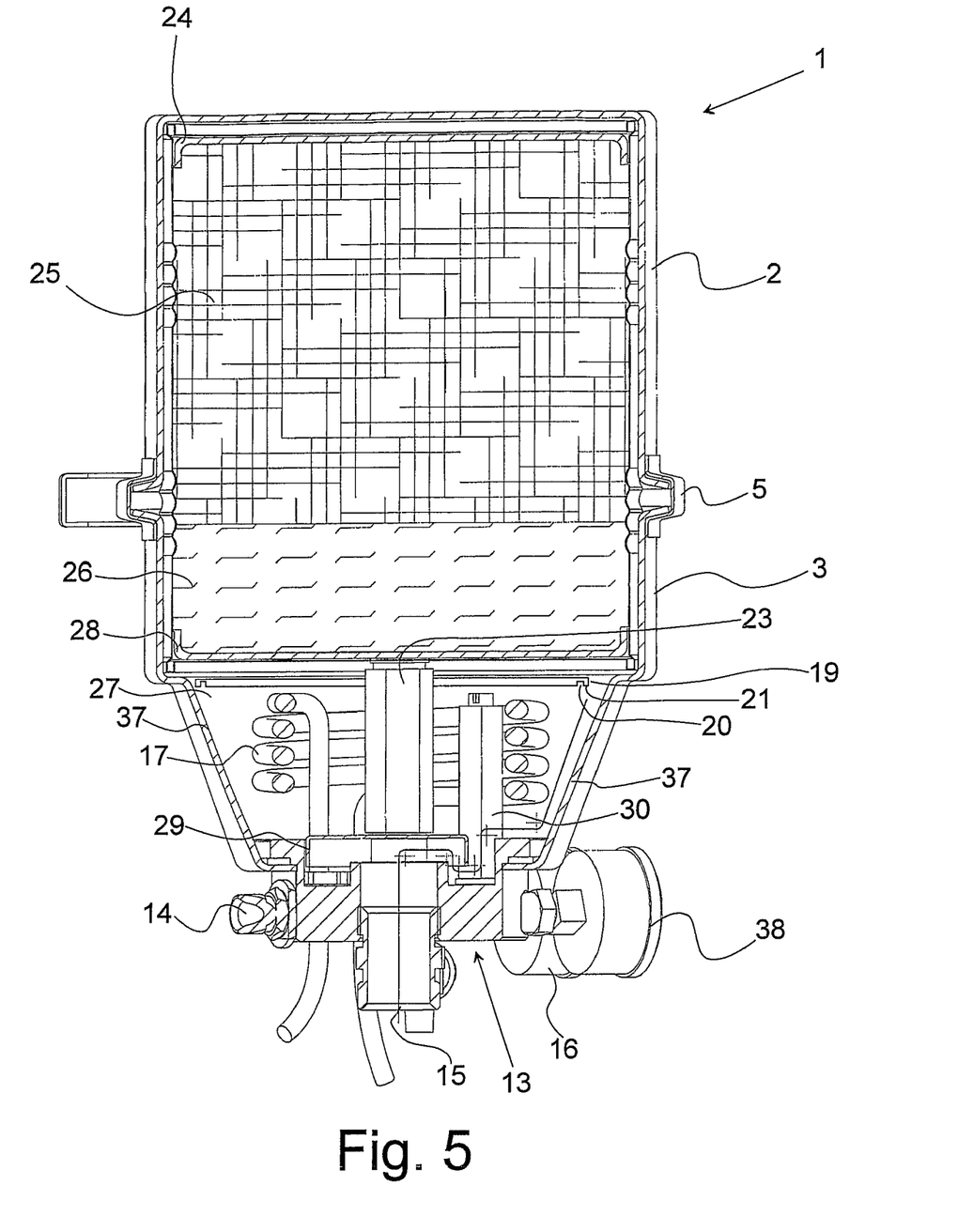

FIG. 1 shows the different parts of a reclamation unit 1, comprising a upper part 2 and a lower part 3 of a housing 4, which is connectable in an airtight manner by a conical lever band 5, where the conical lever band 5 engages a lower edge 6 of the upper part 2 and a upper edge 7 of the lower part 3. Inside the upper part 2 of the housing 4 is enclosed a filter unit 8 comprising a filter canister 9, with a central inlet tube 10 and a number of outlet holes 11 in the bottom lid 12. The lower part 3 of the housing 4 is connected to a base part 13, which is provided with an oil inlet 14, an oil outlet 15, a pressure gauge 16, a flow regulator (not shown) and a heating coil 17 and a sampling outlet 18.

FIGS. 2 to 5 show cross sections of the reclamation unit 1. To give a better understanding of the construction of the reclamation unit 1 with a detailed description being given below of the oil way through the reclamation unit 1.

Oil enters the reclamation unit 1 at oil inlet 14, which is shown as a standard hose fitting. Immediately the oil passes through a flow regulator 22, which meters the flow independent of input pressure.

The filter pressure is monitored at a pressure gauge 16. By employing a flow regulator 22, the filter unit 8 is protected from uncontrolled excess oil flow that could damage the filter unit 8 structure caused by pressure variations at the oil inlet 14. Furthermore, by maintaining oil flow at a controlled steady level, filter contamination is directly proportional to increased pressure read on the pressure gauge 16.

From the flow regulator 22, the oil passes through an ascension tube 23 up in to the inlet tube 10 in the filter canister 9 and distributes through a coarse filter membrane 24 into the first filter material 25, which is hydrophobic treated natural wool fibers. The coarse filter membrane 24 prevents filtered contaminants and filter material 25 from returning to the inlet tube 10

Oil passes through the first filter material 25 into the second filter material 26, which are of fine-mesh treated natural cotton where very small solid contaminants are retained. If the fibers of the second filter material 26 furthermore are acid-neutralizing fibers, they cause neutralization of acid contaminant as well. After the second filter material the oil passes through a second filter membrane 28 and leaves the filter canister 9 through the outlet holes (not shown) in the bottom lid 12 of the filter canister 9. The second filter membrane 28 prevents fibers from the second filter material 26 passing out of the outlet holes (not shown).

Oil enters the evaporator chamber 27 via separator plate 19 who guides the oil to the side walls 37 of the evaporator chamber 27 where the oil forms an airtight oil film. The separator plate 19 has four main functions. It supports the filter canister 9, it guides oil to the edge of the evaporator chamber 27, a drip nose 21 therein prevents oil from flowing underneath the separator plate 19 and it insulates the heat of the evaporation chamber 27 from the filter unit 8. Hence steam and heat is prevented from condensing at the filter canister 9, because the evaporator chamber 27 is completely closed off.

The evaporation chamber 27 is heated by an electrical heater coil 17, which is arranged to encircle the ascension tube 23 at a distance from the side walls 37 of evaporation chamber 27, to heat the oil film by convection.

Oil flows down the evaporator chamber 27 side walls 37 which forms a thin film with maximum surface area. When the oil reaches the bottom of the side walls 37, any water which was present at the entry into the evaporation chamber has been removed. The oil fills the lower part of the evaporation chamber 27. Plate member 29 forms a liquid trap with the oil accumulating in the lower part of the evaporation chamber 27 which prevents steam from passing out of the oil outlet 15. The oil leaves the reclamation unit 1 through oil out let 15 shown as a hose connection fitting.

Steam formed in the evaporation chamber 27 passes through an air breather valve 30. In normal operation, steam leaves the evaporation chamber 27 through the nipple 31 down to the ball 32, passes the ball 32, which has a smaller diameter than the tube of the air breather valve 30, through the spring windings 33, through the steam indicator 38, and finally out to the atmospheric pressure. The steam indicator 38 operates by condensing dew or droplets from the steam outlet 34 on a translucent viewing glass 39. The compartment 40 behind the viewing glass 39 has a black, light-absorbing surface 41 that makes it possible to see very small amounts of dew on the viewing glass surface 39. A viewing glass 39 permits a user to view compartment 40 to see the surroundings.

In the event of failure, mainly caused by blocking of the oil outlet 15, the evaporation chamber 27 may be filled by oil causing pressure to rise. This, due to oil flowing down in tube of the air breather valve 30 and increased pressure, will cause the valve ball 32 to compress the spring 33. The valve ball 32 then closes the outlet 34 at the seat of the bottom of the tube of the air breather valve 30. Oil is thus prevented from entering the steam outlet 34. When the failure is remedied, pressure again turns back to normal operation, the valve ball 32 opens and steam may pass the air breather valve 30.

Figure 6:
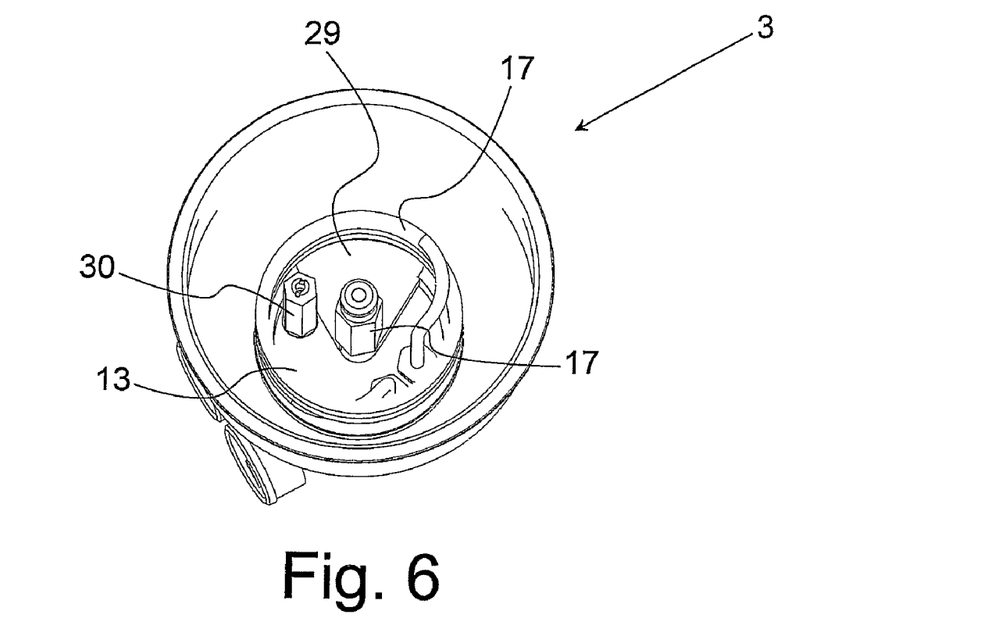
FIG. 6 shows a detail view of the lower part of the housing and the base part according to the invention.

FIG. 6 shows a detailed view of the lower part 3 of the housing 4 and the base part 13, where the heating coil 17 encircles the ascension tube 23. The plate member 29 can be arranged on the base part 13 so that it covers the oil outlet (not shown) and thereby forms a liquid trap. The air breather valve 30 is shown inside the heating coil 17.

Figure 7:
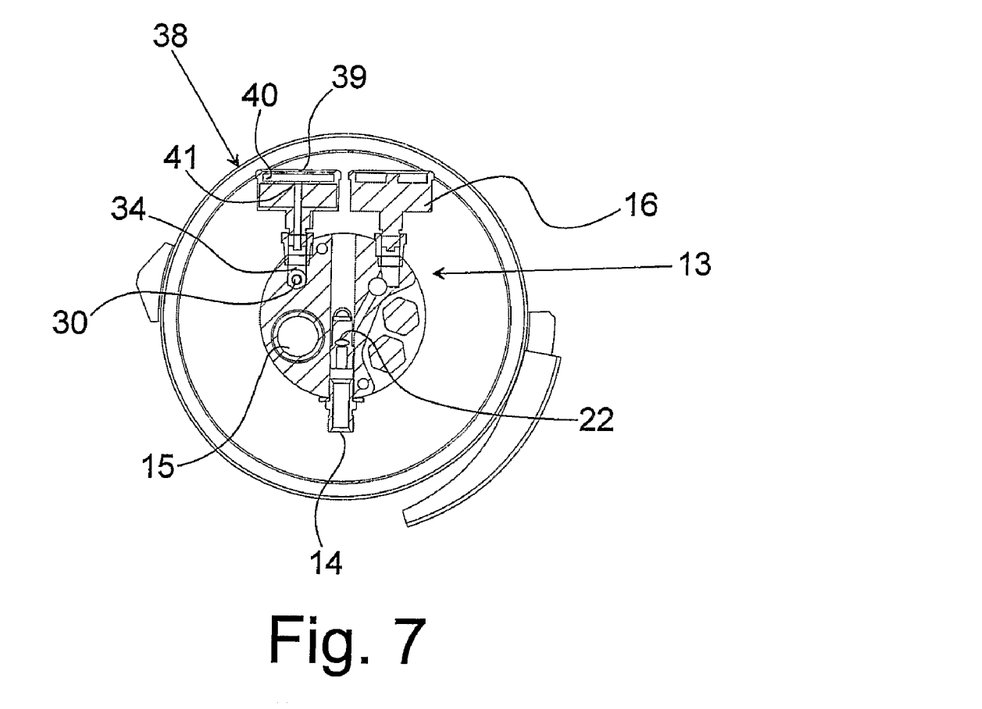
FIG. 7 shows a cross section of a base part according to the invention.

FIG. 7 shows a cross section of the base part 13 where it is possible to see the arrangement of the oil inlet 14, the flow regulator 22, the pressure gauge 16, the steam indicator 38, and the air breather valve 30. The steam indicator 38 is connected to the air breather valve 30 by steam outlet 34 and comprises a compartment 40 with a front viewing glass 39 and a black surface 41.

Figure 8:
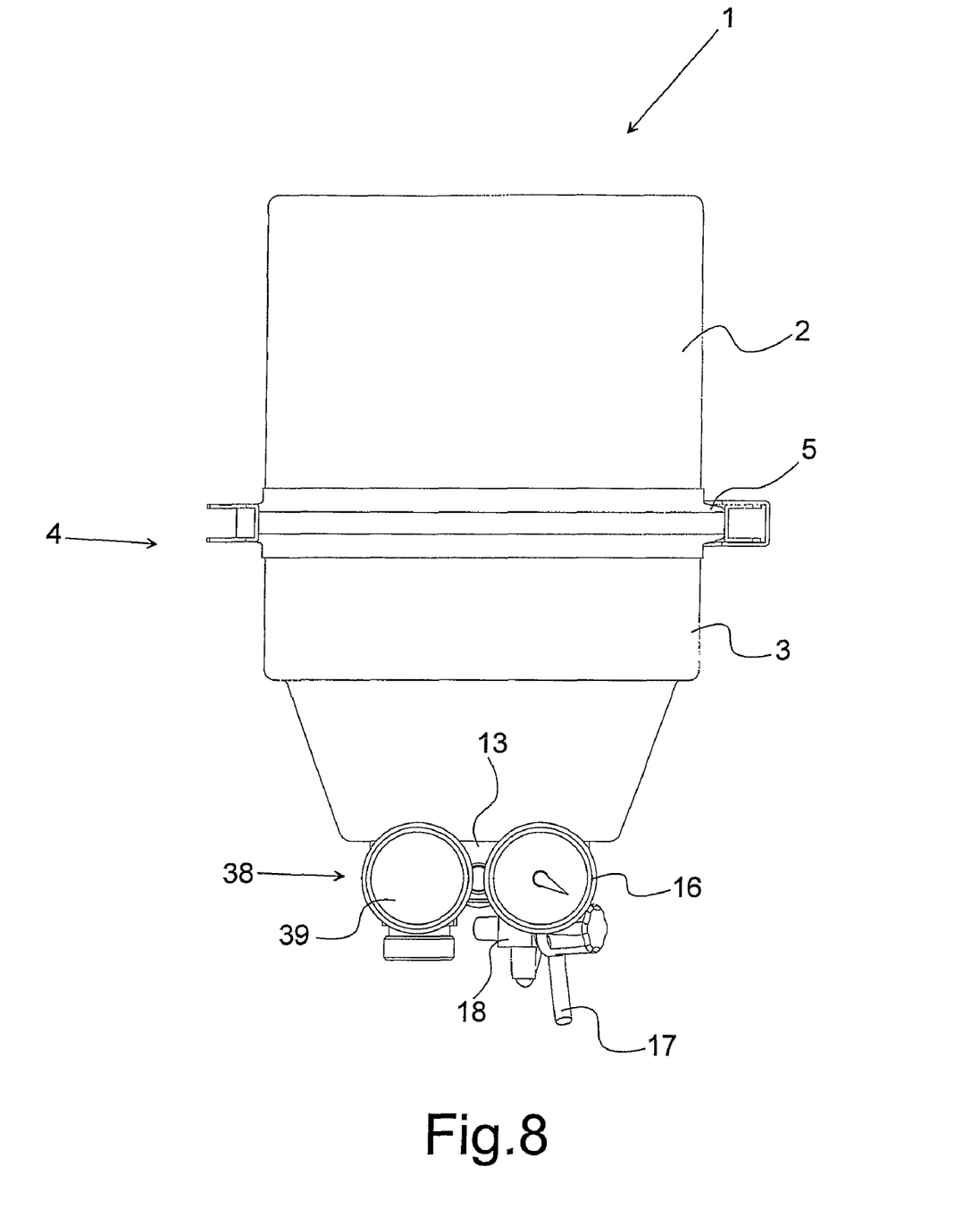
FIG. 8 shows a front view of the reclamation unit, according to the invention.

FIG. 8 shows a front view of the reclamation unit 1 where it is assembled, and the conical lever band 5 connects the upper part 2 and the lower part 3 of the housing 4. It is furthermore possible to see the steam indicator 38 and the pressure gauge 16 aligned on the front side of the reclamation unit. This makes it very easy to see if there is any water in the oil and to monitor the rate of contamination of the filter unit (not shown).

The invention claimed is:

1. A reclamation unit for a liquid comprising:
   a housing including a detachable upper part and a lower part which is connected with a base, at least one heating unit, at least one inlet, and at least one outlet, a separator, at least one filter and an evaporation chamber with a side wall, wherein the upper part encloses the at least one filter, the separator defines a top portion of the evaporation chamber, supports the at least one filter and guides the liquid from the at least one filter onto the side wall of the evaporator chamber, and wherein the at least one heating unit is disposed within the evaporator chamber without conductive contact thereof with the side wall.

2. A reclamation unit according to claim 1, wherein the base comprises at least one pressure indicator, at least one steam indicator, and at least one flow regulator.

3. A reclamation unit according to claim 2, wherein the separator is provided with an encircling recess facing the evaporator chamber.

4. A reclamation unit according to claim 3, wherein the base comprises a plate member forming a liquid trap.

5. A reclamation unit according to claim 4, wherein the reclamation unit comprises a pump.

6. A reclamation unit according to claim 3, wherein the reclamation unit comprises a pump.

7. A reclamation unit according to claim 2, wherein the base comprises a plate member forming a liquid trap.

8. A reclamation unit according to claim 7, wherein the reclamation unit comprises a pump.

9. A reclamation unit according to claim 2, wherein the reclamation unit comprises a pump.

10. A reclamation unit according to claim 1, wherein the separator is provided with an encircling recess facing the evaporator chamber.

11. A reclamation unit according to claim 10, wherein the base comprises a plate member forming a liquid trap.

12. A reclamation unit according to claim 11, wherein the reclamation unit comprises a pump.

13. A reclamation unit according to claim 10, wherein the reclamation unit comprises a pump.

14. A reclamation unit according to claim 1, wherein the base comprises a plate member forming a liquid trap.

15. A reclamation unit according to claim 14, wherein the reclamation unit comprises a pump.

16. A reclamation unit according to claim 1, wherein the reclamation unit comprises a pump.

17. A reclamation unit according to claim 1, wherein the upper part and the lower part of the housing are connected with a releasable fastening means to be airtight.

18. A filter unit combined with a reclamation unit the reclamation unit comprising:
   a housing including a detachable upper part and a lower part which is connected with a base, at least one heating unit, at least one inlet, and at least one outlet, a separator, at least one filter and an evaporation chamber with a side wall, wherein the upper part encloses the at least one filter, the separator defines a top portion of the evaporation chamber, supports the at least one filter and guides the liquid from the at least one filter onto the side wall of the evaporator chamber, and wherein the at least one heating unit is disposed within the evaporator chamber without conductive contact thereof with the side wall; and
   the filter unit comprising a filter canister, including membranes, which encloses an inlet tube, a first filter including hydrophobic fibers and a second filter including mesh fibers.

19. A filter unit combined with a reclamation unit according to claim 18, wherein the hydrophobic fibers are treated natural wool.

20. A filter unit combined with a reclamation unit according to claim 18, wherein the mesh fibers are treated natural cotton.

21. A filter unit combined with a reclamation unit according to claim 18, wherein a ratio of the hydrophobic fibers and the mesh fibers used in the first and second filters is approximately 70:30.

* * * * *